United States Patent
Yontz et al.

(10) Patent No.: US 9,566,474 B2
(45) Date of Patent: Feb. 14, 2017

(54) GOLF BALL WITH SOFT COATING AND HARD COVER

(71) Applicant: NIKE, Inc., Beaverton, OR (US)

(72) Inventors: Nicholas Yontz, Portland, OR (US); Bradley C. Tutmark, Aloha, OR (US); Yasushi Ichikawa, Tualatin, OR (US); Hideyuki Ishii, Tualatin, OR (US); Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 295 days.

(21) Appl. No.: 13/836,830

(22) Filed: Mar. 15, 2013

(65) Prior Publication Data

US 2014/0274473 A1 Sep. 18, 2014

(51) Int. Cl.

| A63B 37/14 | (2006.01) |
|---|---|
| A63B 37/00 | (2006.01) |
| C09D 175/04 | (2006.01) |
| A63B 45/00 | (2006.01) |
| C08G 18/78 | (2006.01) |
| C09D 175/06 | (2006.01) |
| C08G 18/42 | (2006.01) |

(52) U.S. Cl.
CPC ....... *A63B 37/0022* (2013.01); *A63B 37/0031* (2013.01); *A63B 37/0074* (2013.01); *A63B 37/0075* (2013.01); *A63B 45/00* (2013.01); *C08G 18/42* (2013.01); *C08G 18/7831* (2013.01); *C09D 175/04* (2013.01); *C09D 175/06* (2013.01)

(58) Field of Classification Search
CPC ............ A63B 37/0022; A63B 37/0023; A63B 37/0031;C09D 175/00; C09D 175/04; C09D 175/08
See application file for complete search history.

(56) References Cited

U.S. PATENT DOCUMENTS

| 4,183,836 | A | 1/1980 | Wolfe, Jr. | |
|---|---|---|---|---|
| 5,695,414 | A | 12/1997 | Yokota | |
| 5,957,785 | A * | 9/1999 | Masutani et al. | 473/377 |
| 6,395,861 | B1 | 5/2002 | Kennedy, III | |
| 6,488,596 | B1 * | 12/2002 | Maruoka et al. | 473/378 |
| 7,250,009 | B2 | 7/2007 | Weber | |
| 7,270,615 | B2 | 9/2007 | Endo et al. | |
| 7,592,398 | B1 | 9/2009 | Rye et al. | |
| 8,193,296 | B2 | 6/2012 | Ishii et al. | |
| 2003/0050425 | A1 * | 3/2003 | Kennedy et al. | 528/55 |

(Continued)

FOREIGN PATENT DOCUMENTS

WO 2012089827 A1 7/2012

OTHER PUBLICATIONS

Notification of Transmittal of the International Search Report and the Written Opinion of the International Searching Authority in connection with International Patent Application No. PCT/US2013/051597 mailed on Feb. 27, 2013; 11 pages.

*Primary Examiner* — John E Simms, Jr.

(74) *Attorney, Agent, or Firm* — Honigman Miller Schwartz and Cohn LLP (57) ABSTRACT

A golf ball has a cover with a Shore D hardness of at least about 59 and a coating on the cover that has at least one of (a) a pencil hardness of 2 B or less, (b) a Sward hardness of about 40 or less, or (c) a Hit (Young's Modulus)<20 N/mm² and $h_{max}$>0.55 micrometer.

9 Claims, 1 Drawing Sheet

(56) References Cited

U.S. PATENT DOCUMENTS

| | | | |
|---|---|---|---|
| 2004/0254032 A1* | 12/2004 | Lutz et al. | 473/378 |
| 2006/0009607 A1* | 1/2006 | Lutz et al. | 528/68 |
| 2006/0089419 A1* | 4/2006 | Hogge et al. | 522/174 |
| 2008/0015055 A1 | 1/2008 | Lutz et al. | |
| 2008/0064530 A1* | 3/2008 | Matroni et al. | 473/378 |
| 2009/0062037 A1* | 3/2009 | Ohama et al. | 473/378 |
| 2011/0033712 A1 | 2/2011 | Xie et al. | |
| 2011/0244989 A1* | 10/2011 | Tarao et al. | 473/385 |
| 2012/0238379 A1 | 9/2012 | Sullivan et al. | |
| 2013/0045820 A1 | 2/2013 | Sullivan et al. | |
| 2013/0053183 A1* | 2/2013 | Kennedy et al. | 473/378 |

\* cited by examiner

GOLF BALL WITH SOFT COATING AND HARD COVER

FIELD OF THE INVENTION

The invention concerns golf balls with coated covers.

BACKGROUND

This section provides information helpful in understanding the invention but that is not necessarily prior art.

Modern golf balls are typically made with a durable cover. The golf ball may have a two-piece construction with the cover and a one-piece rubber or elastomer core or a multi-piece construction with multiple inner layers selected from rubbers or elastomers, including natural and synthetic rubbers, styrene butadiene, polybutadiene, poly(cis-isoprene), or poly(trans-isoprene) (which is synthetic "balata" and is typically used as a cover material), and hard, thermoplastic materials such as olefin-based ionomer resins. The outer cover may be made from a variety of thermoplastic and thermoset materials, such as olefin-based ionomers, polyamides, polyesters, polyurethanes, and polyureas. Golf balls are also often coated with an abrasion-resistant surface coating, for example a polyurethane coating with a pencil hardness of 3 H or a Sward hardness of more than 40. Such a hard coating typically is formulated to give a glossy appearance and durability to the ball.

The cover hardness may vary depending on the properties desired for the ball. Harder-cover golf balls as a whole produce low spin, and thus longer distance, on driver and long iron shots. However, hard-covered golf balls may not provide the best play for skilled players, who seek to maintain control as well as to achieve maximum distance on tee and fairway shots. A highly skilled golfer may find an advantage with golf balls having a multilayer construction with a low hardness cover and a higher hardness inner layer. This construction can produce low spin off the tee, though not as low as could be had with a harder cover, but higher spin on shorter iron and wedge shots. The ability to control the ball on short irons and wedge shots by putting more backspin on the ball allows for better control of the golf ball when it lands.

SUMMARY OF THE DISCLOSURE

This section provides a general summary of the disclosure and may not be comprehensive of its full scope or all of the disclosed features.

Disclosed is a golf ball with a cover having a Shore D hardness of at least about 59 (a "hard" cover), including in various embodiments a Shore D hardness from about 59 to about 76 and a coating layer on the cover that has one of: (a) a pencil hardness of 2 B or less, including in various embodiments a pencil hardness from 7 B to 2 B, (b) a Sward hardness of about 40 or less, including in various embodiments a Sward hardness from about 22 to about 40, or (c) a Hit (Young's Modulus)<20 N/mm$^2$ or from about 3 N/mm$^2$ up to about 20 N/mm$^2$ and h$_{max}$>0.55 micrometer or from about 0.55 micrometer to about 1.3 micrometer. Any coating with a pencil hardness of 2 B or less or a Sward hardness of 40 or less or a Hit (Young's Modulus)<20 N/mm$^2$ and h$_{max}$>0.55 micrometer is a "soft" coating. Shore hardness of the cover is measured according to ASTM D2240 on a land area of the cover (i.e., between dimples; the dimple fret area) on the ball before it is coated; pencil hardness of the coating is measured according to ASTM D3363 over a land area of the ball; Sward hardness of the coating is measured according to ASTM D2134 over a land area of the ball. Hit (Young's Modulus) and h$_{max}$ are determined using a Dynamic Ultra Micro Hardness Tester DUH-211 equipped with a triangular pyramid indenter with tip angle of 115° using a test force of 0.1 mN; 3, a loading speed of 0.015 mN/sec, as measured in the dimple fret area (measurements taken at room temperature).

The hard cover may be thermoset or thermoplastic. In various embodiments, the cover includes a thermoset polyurethane or a partially or lightly crosslinked thermoplastic polyurethane.

In various embodiments, the soft coating is a polyurethane coating. In certain of these embodiments, the coating comprises a polyurethane that is a reaction product of (a) at least one polyisocyanate (which may be an oligomer such as a biuret of an alkylene or arylene diisocyanate), (b) at least one polymeric polyol (which may be a polyester diol or branched polyester polyol), (c) optionally, at least one further reactant with two or more isocyanate-reactive groups, and (d) optionally, a polysiloxane or fluoropolymer having at least one functional group reactive with isocyanate, hydroxyl, or with another functional group present in one of the reactants forming the polyurethane.

Also in various embodiments, the coating comprises a fluoropolymer or polysiloxane that is not reacted into a polyurethane binder resin of the coating.

Further disclosed is a method of making a coated golf ball in which a golf ball having a cover with a Shore D hardness of at least about 59 is coated with a composition comprising a polyisocyanate (which may be a biuret of an alkylene or arylene diisocyanate), at least one polymeric diol, at least one branched polyol, and, optionally, a further compound having at least one functional group reactive with isocyanate or hydroxyl functionality. The further compound may be a polysiloxane or fluoropolymer. In various embodiments, the cover comprises a polyurethane elastomer.

Difficulty in controlling the spin of a hard-cover golf ball is believed to be due at least in part to a tendency for a hard cover to slip up a club face. It was expected a soft coating provide equivalent results over any cover in overcoming a surface phenomenon like slip and that a soft cover would continue to provide better ball control. The golf balls according to the invention surprisingly provide a skilled golfer with distance comparable to normally coated balls (i.e., balls with hard coatings) when hit with a driver or long iron but relatively more control when hit with a short iron or wedge and, particularly, a putter. The combination of a hard cover and the soft coating unexpectedly results in a greater increase in spin rate on shorter wedge shots as compared to other coating-cover combinations and a decrease in spin rate on full iron shots from longer distances, while providing improved "feel" and "click" over those available from balls with a softer cover. A higher increase in spin rate can be obtained on shorter iron and wedge shots with the soft coating as just defined on a hard cover as just defined than can be obtained with the same coating on a softer cover or with a harder coating on the same hard cover, while at the same time the combination of the soft coating on a hard cover provides less spin on a driver shot and, accordingly, greater distance as compared with a combination of the soft coating on a softer cover.

A ball is "conforming" if it conforms to the rules of one or more of the organizations that govern professional tournament play, such as the United States Golf Association (USGA), the R&A, and the Japan Golf Association; otherwise, the ball is "nonconforming."

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description of the invention, for convenience, "polymer" and "resin" are used interchangeably to encompass resin, oligomer, and polymer. "Binder" refers to the film-forming components of the coating composition. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

It should be understood that the description and specific examples are intended for purposes of illustration only and are not intended to limit the scope of the claims.

BRIEF DESCRIPTION OF THE DRAWINGS

The drawings illustrate some aspects of the disclosed technology.

The parts of the figures are not necessarily to scale.

DETAILED DESCRIPTION

A detailed description of exemplary, nonlimiting embodiments follows.

The disclosed golf balls have at least a core, a cover having a Shore D hardness of at least about 59 (which will be called a "hard" cover), and a coating layer on the cover, with the coating layer having at least one of: (a) a pencil hardness of 2 B or less, (b) a Sward hardness of about 40 or less, or (c) a Hit (Young's Modulus)<20 N/mm² and $h_{max}$>0.55 micrometer (which will be called a "soft" coating).

Figure 1:
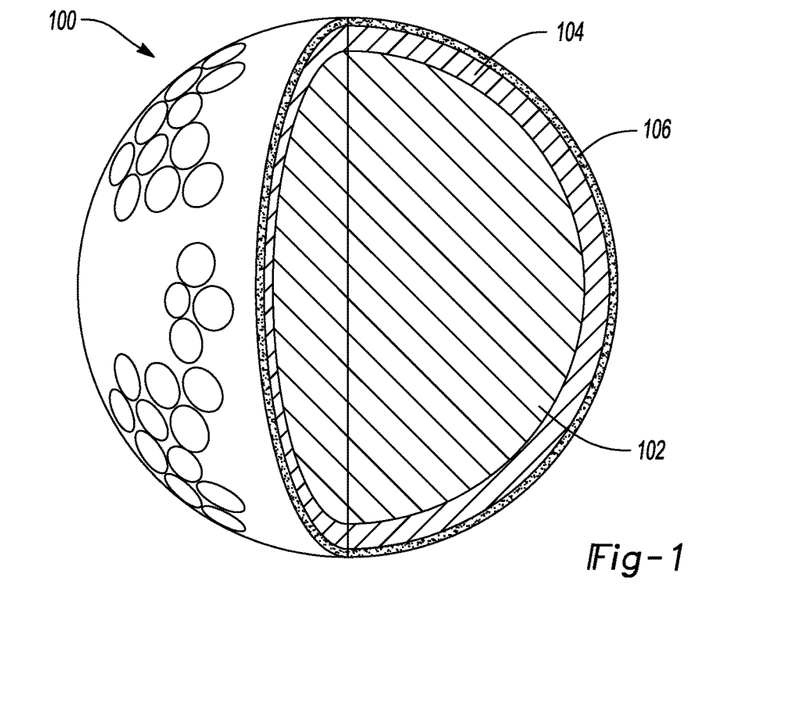
FIG. 1 is a partially cutaway perspective cross-sectional view of a golf ball according to one embodiment of a disclosed invention.
Figure 2:
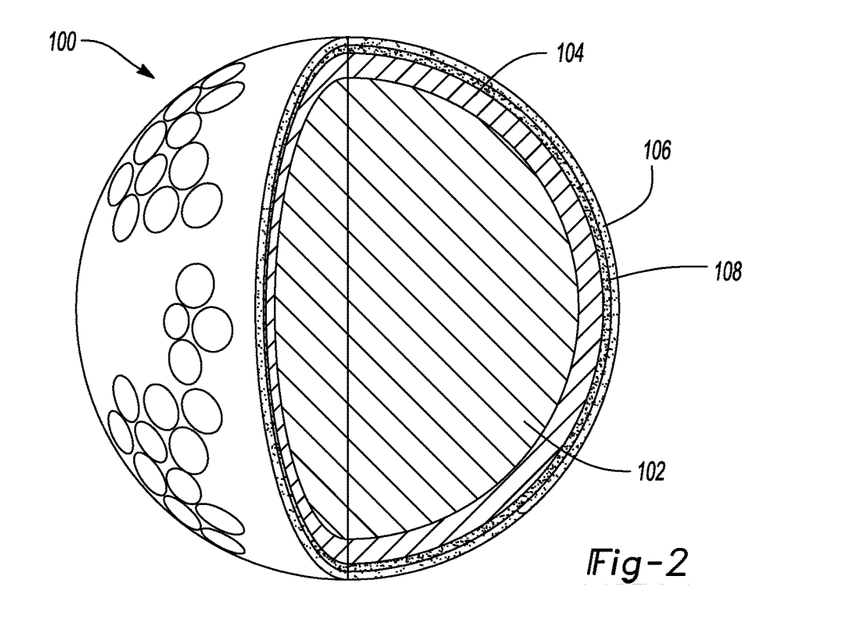
FIG. 2 is a partially cutaway perspective cross-sectional view of a golf ball according to another embodiment of a disclosed invention.

Referring to the figures, FIG. 1 shows a partially cutaway cross-section of an example golf ball 100 having a center or core 102 and a hard cover 104. A soft coating 106 is applied on the surface of the hard cover 104. In FIG. 2, a primer layer 108 is applied to the hard cover 104 before the soft coating 106. The primer layer 108 serves to improve adhesion of the soft coating 106 to the hard cover 104 when such improvement is needed, for instance when a corona discharge or plasma treatment of the cover surface before coating does not provide sufficient adhesion. The primer may typically be a waterborne polyurethane dispersion (PUD) such as Witcobond W-234.

The core of the golf ball may be solid, semi-solid (e.g., paste or gel), hollow, or filled with a fluid or powder in a one-piece or multi-piece construction. A fluid in the core may be a liquid, paste, gel, gas, or some combination of these. Nonlimiting examples of suitable core materials include thermoset elastomers, thermoplastic elastomers, and ionomers. Nonlimiting examples of elastomers include natural rubber and synthetic rubbers such as styrene butadiene rubber, polybutadiene rubber, polyisoprene rubber, styrene-butadiene rubber (SBR), and ethylene-propylene-diene terpolymer (EPDM). High cis-polybutadiene (at least 40%, preferably at least 70%, and more preferably at least 90% cis-1,4 bond) crosslinked with a crosslinking monomer such as zinc diacrylate is one preferred rubber. Trans-polybutadiene is another suitable rubber from which to form cores. This polybutadiene isomer may be formed by converting the cis isomer polybutadiene to the trans isomer during a molding cycle. Various combinations of polymers, cis-to-trans catalysts, fillers, crosslinkers, and initiators may be used. Typically used crosslinkers include, in general, metal salts of ethylenically unsaturated acids such as acrylic acid and methacrylic acid (e.g., zinc diacrylate, magnesium dimethacrylate). Suitable initiators include peroxide compounds such as dicumyl peroxide, 1,1-di(t-butylperoxy) 3,3,5-trimethyl cyclohexane, a-a bis(t-butylperoxy)diisopropylbenzene, 2,5-dimethyl-2,5 di(t-butylperoxy) hexane, or di-t-butyl peroxide.

The conditions for press-molding a core from the compounded rubber composition should be determined depending on the rubber composition. The press-molding is preferably carried out for 10 to 60 minutes at the temperature of 130 to 200° C.

Thermoplastic elastomers may also be used in or used to modify the core or other layers. For example, thermoplastic elastomers can be blended with the base thermosettable rubber. These thermoplastic elastomers include natural or synthetic balata, or high trans-polyisoprene, high trans-polybutadiene, or any styrenic block copolymer, such as styrene ethylene butadiene styrene, styrene-isoprene-styrene, and so on, a metallocene or other single-site catalyzed polyolefin such as ethylene-octene, or ethylene-butene, or thermoplastic polyurethanes, polyether amide copolymers, polyether ester copolymers, and thermoplastic dynamically crosslinked rubbers such as Santoprene® or Vibram® or ETPV®.

The core or a layer of the core may also be made of or include a highly-neutralized ionomer composition, particularly a metal salt of a random copolymer of an olefin, especially ethylene, and an ethylenically unsaturated acid, such as acrylic acid or methacrylic acid (an "E/X" copolymer), optionally along with an ester of an ethylenically unsaturated acid, such as an alkyl acrylate, particularly used as a softening comonomer (an "E/X/Y" copolymer). The ionomer resin may be neutralized to any degree. In some embodiments, the ionomer resin may be neutralized at least about 20%, or at least about 40% or at least about 70%, or at least 90%, and up to or nearly 100% with an alkali or alkaline earth metal such as sodium or magnesium. The ionomer resin composition may further include a metal salted $C_1$-$C_{36}$ monocarboxylic acid. Suitable ionomer resins are disclosed, for example in U.S. Pat. Nos. 5,179,168, 5,580,927; 6,100,321; 6,777,472; 6,653,383; 6,815,480; 6,953,820; and 7,375,151, all assigned to DuPont, all of which are incorporated herein by reference.

The golf ball may have a multi-layer core where the innermost core section and a mantle layer or each succeeding layer extending outwardly from it is prepared from materials such as any of those already mentioned as useful for the core or from other materials, such as a wound layer formed with tensioned thread material of inorganic (e.g., glass, carbon) or organic (e.g., block copolymer, polyester, crosslinked cis-polyisoprene) fibers.

The core (or each layer of the core) may include fillers Examples of suitable inorganic fillers include metals, zinc oxide, zinc sulfate, barium carbonate, barium sulfate, calcium oxide, calcium carbonate, clay, tungsten, tungsten carbide, tin oxide, zinc carbonate, silica, talc, clays, glass fibers, natural fibrous minerals, and combinations of these. Fillers may be used to adjust the specific gravity, modulus, and other physical properties.

Other customary additives may be included, such as wetting or dispersing additives, processing aids, surfactants, foaming agents, blowing agents, antioxidants, regrind (recycled core material), and polymeric, ceramic, metal, and glass microspheres, which may be solid or hollow, filled or unfilled.

The core is formed, then covered with the hard cover. The golf balls may be formed using a variety of techniques such as compression molding, thermoforming, injection molding including retractable pin injection molding, reaction injection molding (RIM), and liquid injection molding (LIM), casting, vacuum forming, powder coating, flow coating, spin coating, dipping, spraying, and so on depending on the materials used for a specific component. For example, casting, RIM, or LIM may be preferred when the material is thermoset, whereas compression molding or injection molding may be preferred for liquid compositions or thermoplastic precursors. These methods may be used in preparing the core (unitary or with outer layers), which may then be covered with a dimpled cover layer formed, for example, by injection molding, compression molding, casting, vacuum forming, powder coating, injection molding, and so on.

The cover of the golf ball has a hardness of at least about a Shore D hardness of 59 In various embodiments the cover has a Shore D hardness from about 59 or about 60 or about 62 to about 76 or to about 73 or to about 70.

A hard cover may contain one or more of various polymers. In a first embodiment, the cover comprises a crosslinked thermoplastic polyurethane elastomer including hard segments and soft segments, in which the crosslinks are formed in the hard segments. The polyurethane may be lightly crosslinked so as to form a thermoplastic polyurethane cover, or may be crosslinked to an extent sufficient for the cover to be thermoset. The crosslinks are brought about by addition reaction of ethylencially unsaturated bonds located in the hard segments that may be crosslinked by free radical initiation, for example using heat or actinic radiation.

The crosslinks may be made through allyl ether side groups provided by forming the thermoplastic polyurethane using an unsaturated diol having two isocyanate-reactive groups, for example primary hydroxyl groups, and at least one allyl ether side group. Nonlimiting examples of such unsaturated diols include those of the formula in which R is a substituted or unsubstituted alkyl group and x and y are independently integers of 1 to 4. In one particular embodiment, the unsaturated diol may be trimethylolpropane monoallylether ("TMPME") (CAS no. 682-11-1). TMPME is commercially available, for example from Perstorp Specialty Chemicals AB. Other suitable compounds that may be used as the unsaturated diol may include: 1,3-propanediol, 2-(2-propen-1-yl)-2-[(2-propen-1-yloxy) methyl]; 1,3-propanediol, 2-methyl-2-[(2-propen-1-yloxy) methyl]; 1,3-propanediol, 2,2-bis[(2-propen-1-yloxy) methyl; and 1,3-propanediol, 2-[(2,3-dibromopropoxy) methyl]-2-[(2-propen-1-yloxy)methyl]. The crosslinked polyurethane is prepared by reacting the unsaturated diol, at least one diisocyanate, at least one polymeric polyol having a number average molecular weight of from about 500 and to about 4,000, optionally at least one nonpolymeric reactant with two or more isocyanate-reactive groups (an "extender") that typically has a molecular weight of less than about 450, and a sufficient amount of free radical initiator to generate free radicals that induce crosslinking through addition polymerization of the ethylenically unsaturated groups.

Ethylenic unsaturation may also be introduced after the polyurethane is made, for example by copolymerizing dimethylolpropionic acid then reacting the pendent carboxyl groups with isocyanatoethyl methacrylate, glycidyl methacrylate, glycidyl acrylate, or allyl glycidyl ether.

The amount of unsaturated diol monomer units in the crosslinked thermoplastic polyurethane elastomer may generally be from about 0.1 wt. % to about 25 wt. %. In particular embodiments, the amount of unsaturated diol monomer units in the crosslinked thermoplastic polyurethane elastomer may be about 10 wt. %. Furthermore, the NCO index of the reactants making up the crosslinked thermoplastic polyurethane elastomer may be from about 0.9 to about 1.3. As is generally known, the NCO index is the molar ratio of isocyanate functional groups to active hydrogen containing groups. In particular embodiments, the NCO index may be about 1.0.

Once reacted, the portions of the polymer chain made up of the chain extender and diisocyanate generally align themselves into crystalline domains through weak (i.e., non-covalent) association, such as through Van der Waals forces, dipole-dipole interactions or hydrogen bonding. These portions are commonly referred to as the hard segments because the crystalline structure is harder than the amorphous portions made up of the polymeric polyol segments. The crosslinks formed from addition polymerization of the allyl ether or other ethylenically unsaturated side groups are understood to be in such crystalline domains.

Nonlimiting examples of suitable aromatic, aliphatic, or cycloaliphatic diisocyanates that may be used include diphenylmethane-4,4'-diisocyanate (MDI, which may be used in a mixture with its 2,2' or 2,4 isomer), 2,4- or 2,6-toluene diisocyanate (TDI, the isomers often being used in admixture), p-phenylene diisocyanate, ethylene diisocyanate, 1,2- diisocyanatopropane, 1,3-diisocyanatopropane, tetramethylene diisocyanate, hexamethylene diisocyanate, dicyclohexylmethane-4,4'-diisocyanate, isophorone diisocyanate, dicyclohexylmethane-2,4'-diisocyanate, 1,3-bis(isocyanatomethyl)cyclohexane, methylene bis-4-cyclohexyl isocyanate ($H_{12}$MDI), m-tetramethyl xylene diisocyanate (m-TMXDI), p-tetramethyl xylene diisocyanate (p-TMXDI), diisocyanates derived from dimer fatty acids, lysine diisocyanate, meta-xylylenediiscyanate and para-xylylenediisocyanate, 1,5-tetrahydro-naphthalene diisocyanate, 4,4'-dibenzyl diisocyanate, and mixtures of these. Nonlimiting examples of higher-functionality polyisocyanates that may be used in limited amounts to produce branched thermoplastic polyurethanes (optionally along with monofunctional isocyanates or isocyanate-reactive compounds) or in higher amounts to produce thermoset polyurethanes include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, 1,8-diisocyanato-4-isocyanatomethyloctane, 1,7-diisocyanato-4-isocyanatomethylheptane, 1-isocyanato-2-(3-isocyanatopropyl)-cyclohexane, and higher polyisocyanates such as triphenylmethane-4,4',4"-triisocyanate, isocyanurates of diisocyanates, biurets of diisocyanates, allophanates of diisocyanates, other oligomers such as polymeric diphenylmethane diisocyanate (also called polymethylene polyphenylisocyanate or poly-MDI or PMDI), and isocyanate-functional compounds containing urethane, urea, carbodiimide, or uretdione groups. Polyisocyanates containing urethane groups, for example, are obtained by reacting some of the isocyanate groups with polyols, such as trimethylolpropane, pentaerythritol, and glycerol, for example. Suitable polyisocyantes also include polyisocyanates derived from diisocyanates, such as any of those already mentioned, that contain isocyanurate, biuret, allophanate, iminooxadiazinedione, carbodiimide, or uretdione groups. Generally, only diisocyanates are used when thermoplastic polyurethane covers are desired. In various embodiments, aliphatic diisocyanates are preferred. Some embodiments include as preferred polyisocyanates one or more of hexamethylene diisocyanate, isophorone diisocyanate, 2-isocyanatopropylcyclohexyl isocyanate, dicyclohexyl-methane 2,4'-diisocyanate, dicyclohexylmethane 4,4'-diisocyanate, diphenylmethane-4,4'-diisocyanate, 1,3-bis(isocyanatomethyl)cyclohexane (BIC), and mixtures of these.

Nonlimiting examples of suitable polymeric polyols include polyester polyols, polyether polyols, and polycarbonate polyols such as polytetrahydrofurans, polyesters, polycaprolactone polyesters, and polyethers of ethylene oxide, propylene oxide, and copolymers of ethylene oxide and propylene oxide.

In certain embodiments, the crosslinked thermoplastic polyurethane elastomer is prepared using a polyester diol. In general, suitable polyester diols may be prepared by the condensation polymerization of polyacid compounds and polyol compounds. Preferably, the polyacid compounds and polyol compounds are difunctional, i.e., diacid compounds and diols are used to prepare linear polyester diols, although minor amounts of mono-functional, tri-functional, or higher functionality materials (perhaps up to 5 mole percent) can be included to provide a slightly branched polyester polyol, particularly when a thermoset cover is desired. Suitable dicarboxylic acids include, without limitation, glutaric acid, succinic acid, malonic acid, oxalic acid, phthalic acid, hexahydrophthalic acid, adipic acid, maleic acid and combinations of these. Suitable diols include, without limitation, ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, and combinations of these. As mentioned, small amounts of triols or higher functionality polyols, such as trimethylolpropane or pentaerythritol, may sometimes be included. In a preferred embodiment, the carboxylic acid polymerized includes adipic acid and the diol polymerized includes diethylene glycol. Typical catalysts for the esterification polymerization may be used, such as protonic acids, Lewis acids, titanium alkoxides, and dialkyltin oxides.

Examples of suitable polymeric polyether or polycaprolactone diol reactant used in preparing a polyurethane may be prepared by reacting a diol initiator, e.g., ethylene or propylene glycol or any of the other diols already mentioned, with a lactone or alkylene oxide chain-extension reagent. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Useful catalysts for polymerization of polyesters from lactones include, without limitation those mentioned above for polyester synthesis. Alternatively, the reaction can be initiated by forming a sodium salt of the hydroxyl group on the initiator molecules that will react with the lactone ring.

A polyether diol may be prepared by reacting a diol initiator with an oxirane-containing compound to produce a polyether diol to be used in the polyurethane polymerization. The oxirane-containing compound is preferably an alkylene oxide or other cyclic ether, especially preferably a compound selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition.

Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Nonlimiting examples of suitable polycarbonate polyols that might be used include those prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate. Aliphatic polycarbonates may be preferred for a higher resistance of the cover to yellowing.

The polymeric diols that are used in the polyurethane synthesis, may preferably have a number average molecular weight (which may be determined by the ASTM D-4274 method) of from about 500 and to about 4,000; more preferably from about 650 to about 2500; and still more preferably from about 1000 to about 2000.

Useful active hydrogen-containing extenders that may be used in addition to the unsaturated diol include other diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Examples of useful diols include those diols already mentioned with regard to making the polymeric diols. Suitable diamine extenders include, without limitation, ethylene diamine, diethylene triamine, hexamethylene diamine, 1,4-cyclohexyene diamine, and combinations of these. Other typical chain extenders are amino alcohols such as ethanolamine, propanolamine, butanolamine, and combinations of these. In various embodiments, aliphatic amines are preferred over aromatic amine extenders because of lower yellowing, and polyurethanes made without any amine reactants may be preferred for the same reason.

Crosslinking of the pendent ethylenic unsaturation of the unsaturated diol may be accomplished using a free radical initiator. Suitable, nonlimiting examples of free radical initiators include peroxides, azo initiators (e.g., 2,2'-azobis (2-methylpropionitrile)), sulfurs, and sulfides; in various embodiments, peroxides are preferred. The peroxides may be aliphatic peroxides or aromatic peroxides. Typical initiators are organic peroxides such as dialkyl, diaryl, and diacyl peroxides such as di-tert-butyl peroxide, diacetyl peroxide, dibenzoyl peroxide, dicumyl peroxide, 2,5-bis-(tert-butylperoxy)-2,5-dimethylhexane, 2,5-dimethyl-2,5-di(benzoylperoxy)hexane, and 2,5-dimethyl-2,5-di(tert-butylperoxy)-3-hexyne; peroxyesters such as tert-butyl peroxy 2-ethylhexanoate, tert-butyl peroxybenzoate, and tert-butyl peroxyacetate; peroxydicarbonates; hydroperoxides such as tert-butyl hydroperoxide; and peroxyketals such as 1,1-bis-(t-butylperoxy)-3,3,5-trimethylcyclohexane and n-butyl-4,4-bis(t-butylperoxyl)valerate; and combinations of these. Other suitable initiators are azo compounds such as 2,2'azobis(2-methylbutanenitrile) and 1,1'-azobis(cyclohexanecarbonitrile); and combinations of these. Chain transfer agents may also be included. Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene. The weight ratio of initiator to the unsaturated diol may be from about 0.1:100 to about 1:1. In particular embodiments, the weight ratio of free radical initiator to unsaturated diol may be from about 1:100 to about 8:100 or from about 3:100 to about 6:100.

Other suitable polymer compositions that can be used to make the hard cover include thermoplastic or thermoset polyurethanes or polyureas not using the ethylenically unsaturated extender and polyurethane-polyurea blends. The thermoset polyurethane, polyurea, or polyurethane-polyurea blends may be prepared as castable thermoset or reaction injection moldable thermoset compositions. Other suitable polymer compositions or the cover include non-ionomeric hard polymers and at least one E/X copolymer or E/X/Y terpolymer, where E is an olefin, X is a carboxylic acid, and Y is a softening comonomer. In another embodiment, the cover may be formed from a stiff thermoplastic polycarbonate-polyurethane. Further examples of suitable polymers that may be used to make the hard cover include polyester/ polycarbonate blends, polyesters and polyester elastomers, liquid crystalline polyesters, acetal resins, polyamides, polyetheramides, polyester/polyamide blends, a poly (arylene ether)/polyester resins, and polyimides.

Besides the crosslinked thermoplastic polyurethane elastomer, other polyurethanes and polyurethane elastomers may be used to make the hard cover. In various embodiments, the cover includes hard (i.e., Shore D≥59) thermoplastic polyurethanes or polyureas with hard segments that are the reaction product of an aromatic or aliphatic diisocyanate and extenders such as any of those already mentioned and soft segments from using one of the polymeric diols as already described as a reactant; polyether and polycarbonate diols are preferred in some embodiments. Hard polyureas can be made similarly but using polyamine reactants, for example by reacting an aromatic or aliphatic diisocyanate with an aromatic or aliphatic chain-extending diamine to form urea linkages and a soft segment provided by one or more of amine-terminated polyethers, polyesters, polycaprolactones, polycarbonates, or so on. One suitable polyurethane cover is prepared used a high indexed two-component composition (such as 15% equivalent excess of isocyanate) in which the polyol component includes 1,4-butanediol and polytetramethylene ether glycol (poly-THF).

Such hard thermoplastic polyurethanes or polyureas can be blended with other thermoplastic polymers, such as polycarbonates, polyvinyl chlorides, acrylonitrile-butadiene-styrenes, polyamides, polycarbonates, styrene-maleic anhydride, styrene-butadiene or styrene-ethylene-butadiene block copolymers, polyolefins, such as polypropylene, polyethylene, ethylene-propylene rubber ("EPR"), ethylene-propylene-diene monomer ("EPDM"), and ethylene-vinyl acetate, or maleic anhydride-modified polyolefins and metallocene-catalyzed polyolefins.

A non-ionomeric cover includes an E/X copolymer or E/X/Y terpolymer. Preferably, the olefin is ethylene; the carboxylic acid is acrylic acid, methacrylic acid, crotonic acid, maleic acid, fumaric acid, itaconic acid, or a combination of these; and the softening comonomer is selected from vinyl esters of aliphatic carboxylic acids of 2 to about 10 carbon atoms, alkyl ethers of 1 to about 10 carbon atoms, alkyl acrylates or alkyl alkylacrylates of 1 to about 10 carbon atoms, or blends of these. In some embodiments, an ethylene/acrylic acid copolymer or an ethylene/methacrylic acid copolymer is preferred, or a terpolymer comprising an ethylene/methyl acrylate/acrylic acid terpolymer, an ethylene/n-butyl acrylate/methacrylic acid terpolymer, or an ethylene/isobutyl acrylate/methacrylic acid terpolymer. The copolymer or terpolymer may have an acid content of from about 1% to about 30% by weight, more preferably from about 3% to about 25%, and most preferably from about 5% to about 20%. Such non-ionomeric acid copolymers and terpolymers typically have high melt flow rate, preferably ranging from about 1 g/10-min to about 500 g/10-min, more preferably from about 3 g/10-min to about 75 g/10-min, and most preferably from about 3 g/10 min to about 50 g/10 min.

The cover can also include ionomers prepared by reacting these acid-functional copolymers with a metal cation.

The E/X copolymer or E/X/Y terpolymer may be combined with a stiffening polymer, for example one selected from polyamides, single-site catalyzed polymers, metallocene-catalyzed polymers, polyesters, poly(ethylene terephthalate), poly(butylene terephthalate), poly(propylene terephthalate), poly(trimethylene terephthalate), poly(ethylene naphthenate), polystyrene polymers, poly[styrene-co-(maleic anhydride)], acrylonitrile-butadiene-styrene copolymers, poly(styrene sulfonate), poly(ethylene styrene), grafted polypropylenes, grafted polyethylenes, poly(vinyl chlorides), grafted poly(vinyl chlorides); poly(vinyl acetates) having less than about 9% of vinyl acetate by weight, polycarbonates, blends of polycarbonates and acrylonitrile-butadiene-styrene copolymers, blends of polycarbonates and polyurethanes, poly(vinyl alcohols) and their copolymers, polyethers, polyarylene ethers, poly(phenylene oxides); block copolymers of alkenyl aromatics with vinyl aromatics and polyamic esters, polyimides, polyetherketones, polyamideimides, and combinations of these. The stiffening polymer may be compatibilized with at least one grafted or copolymerized functional group such as carboxylic acid, carboxylic acid anhydride, amine, epoxide, isocyanate, hydroxyl, carbonate, sulfonate, phosphonate, or a combination of such groups. The stiffening polymer may provide the non-ionomenic composition with a flexural modulus and material hardness substantially greater than the E/X copolymer or E/X/Y terpolymer. The stiffening polymer may be present in an amount of from about 95% to about 5% by weight of the non-ionomeric composition.

Such stiffening polymers may also be included in ionomer covers.

In other embodiments, the cover may include impact modified, non-ionomeric thermoplastic polycarbonate/polyester copolymers. Nonlimiting examples of suitable thermoplastic polycarbonate/polyester copolymers or blends include polycarbonate/poly(butylene terephthalate) (PC/PBT) copolymers, such as those disclosed in U.S. Pat. No. 7,358,305, the disclosure of which is incorporated herein in its entirety by reference. The PC/PBT blend may also be modified by blending with, for example, acrylonitrile butadiene styrene (ABS) copolymers. Other suitable polymers that can be used in the hard cover alone or along with the polycarbonate/polyester copolymers and blends include polyesters, such as polybutylene terephthalate, polyethylene terephthalate (commercially available as Crastin® from DuPont); polyethylene terephthalate (such as DuPont's Rynite®); and Hytrel® grades from DuPont, such as Hytrel® 3078, 4068, 5556, 6356, 7246, and 8238. Hytrel® is a block copolymer of a crystalline hard segment (PBT) and an amorphous soft segment (a polyether, such as THF). Celanese Thermx® PCT polyester is also a suitable material and is based on poly[cyclohexylene-co-(dimethylene terephthalate). Other suitable polyester resins include crystalline polyester resins such as polyester resins derived from an aliphatic or cycloaliphatic diol containing from about 2 to 10 carbon atoms, or mixtures of such diols, and at least one aromatic dicarboxylic acid. Preferred polyesters are derived from an aliphatic diol and an aromatic dicarboxylic acid. Such polyester resins may be selected from linear polyester resins, branched polyester resins and copolymeric polyester resins. Suitable linear polyester resins include polyalkylene phthalates, such as polyethylene terephthalate, polybutylene terephthalate, and polypropylene terephthalate; polycycloalkylene phthalates, such as polycyclohexanedimethanol terephthalate; polyalkylene naphthalates, such as polybutylene-2,6-naphthalate and polyethylene-2,6-naphthalate; and polyalkylene dicarboxylates, such as polybutylene dicarboxylate.

Other suitable polymers that can be used alone or along with the polycarbonate/polyester copolymers and blends include polyesteramide copolymers, cyclohexanedimethanol-terephthalic acid-isophthalic acid copolymers and cyclohexanedimethanol-terephthalic acid-ethylene glycol copolymers. The polyester component can include the reaction product of a glycol portion comprising 1,4-cyclohexanedimethanol and ethylene glycol. The ethylene glycol may be about 60 mole percent or more, based on the total moles of 1,4-cyclohexanedimethanol and ethylene glycol, with an acid portion that includes terephthalic acid, isophthalic acid, or mixtures of both acids. The copolyester may be such a copolyester with the glycol portion about 60 mole percent or more of ethylene glycol, copolymerized with 1,4-cyclohexanedimethanol and terephthalic acid. In another embodiment, the polyester comprises structural units derived from terephthalic acid and a mixture of 1,4-cyclohexanedimethanol and ethylene glycol, with ethylene glycol being greater than about 75 mole percent based on total moles of 1,4-cyclohexanedimethanol and ethylene glycol. The polyesters may include monomer units derived from xylene glycol (o-xylene glycol, m-xylene glycol, or p-xylene glycol). In such embodiments, the polyester preferably includes monomer units derived p-xylene glycol. The xylene glycol may be present in an amount at least about 40 mole percent or more, more preferably from about 50 to 100 mole percent, most preferably about 100 mole percent.

Block copolyester resin components are also useful, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols such as any of those already mentioned. In various embodiments the polyesters may preferably be a polyether ester block copolymer consisting of a thermoplastic polyester as the hard segment and a polyalkylene glycol such as any of those already mentioned as the soft segment.

The polyester can be present in the composition at about 1 to about 99 wt %, based on the total weight of the composition. Within this range, it is preferred to use at least about 25 wt %, more preferably at least about 30 wt % of the polyester. Preferred polyesters have an intrinsic viscosity (as measured in 60:40 solvent mixture of phenol/tetrachloroethane at 25° C.) ranging from about 0.1 to about 1.5 dL/g. Polyesters branched or unbranched and generally will have a weight average molecular weight of from about 5,000 to about 150,000, preferably from about 8,000 to about 95,000 as measured by gel permeation chromatography using 95:5 weight percent of chloroform:hexafluoroisopropanol mixture. Other suitable materials include thermoplastic aliphatic and aromatic polycarbonates and copolymers thereof.

Other suitable hard cover materials are polyester blends with polyamides having at least one terminal acid group, such as those having (A) about 99.98 to about 95 wt % of a polyester of a dicarboxylic acid component comprising repeat units from at least 85 mole percent terephthalic acid, naphthlenedicarboxylic acid or mixtures of these based on total dicarboxylic acid moles and a diol component repeat unit from at least 85 mole percent ethylene glycol based on total alcohol; and (B) a polyamide wherein at least 50% of the polyamide end groups are acid groups. The polyester (A) is typically selected from polyethylene terephthalate, polyethylene naphthalenedicarboxylate, or copolyesters of these.

Polyamides may also be used in the hard cover, for example Nylon 11, 12 and copolymers. Rigid grades of Pebax® poly(amide-ester or amide-ether) are also suitable materials. Other polymers include polyimides, polyetherether ketones, and liquid crystalline polymers. Sorona®, commercially-available from DuPont, is another preferred intermediate cover layer material. DuPont Sorona® EP thermoplastic polymers contain between 20% and 37% renewably sourced material (by weight) and exhibit performance and molding characteristics similar to high-performance PBT (polybutylene terephthalate).

Compatibilized poly(arylene ether)/polyester compositions having stable phase morphology may also be used in the cover. A disperse phase comprising poly(arylene ether) may be present in an amount that is less than or equal to 35 wt % based on the total weight of the composition. The impact modifier may reside in the disperse phase but may also be present at the interface between the phases. When the impact modifier resides in the disperse phase, the combined amount of impact modifier and poly(arylene ether) is less than 35 weight percent (wt %), based on the total weight of the composition. The poly(arylene ether) and impact modifier may be used in an amount of 5 to 35 wt %, or, preferably, 10 to 25 wt %, based on the total weight of the composition. The poly(arylene ether) can comprise molecules having aminoalkyl-containing end group(s), typically located in an ortho position to the hydroxy group. The poly(arylene ether) can be in the form of a homopolymer; a copolymer; a graft copolymer; an ionomer; or a block copolymer; as well as combinations comprising two or more of these. The poly (arylene ether) may include polyphenylene ether comprising 2,6-dimethyl-1,4-phenylene ether units optionally in combination with 2,3,6-trimethyl-1,4-phenylene ether units.

At least a portion of the poly(arylene ether) may be functionalized with a polyfunctional compound (functionalizing agent) such as a polycarboxylic acid or those compounds having in the molecule both (a) a carbon-carbon double bond or a carbon-carbon triple bond and b) at least one carboxylic acid, anhydride, amino, imide, hydroxy group or salts thereof. Examples of such polyfunctional compounds include maleic acid, maleic anhydride, fumaric acid, and citric acid. The poly(arylene ether) can be functionalized prior to making the cover composition or can be functionalized as part of making the cover composition. In some embodiments the poly(arylene ether) can have 0.1 wt % to 90 wt % of structural units derived from a functionalizing agent. Within this range, the poly(arylene ether) can comprise less than or equal to 80 wt %, or, more specifically, less than or equal to 70 wt % of structural units derived from functionalizing agent, based on the total weight of the poly(arylene ether).

Examples of suitable polyesters are poly(allylene dicarboxylates), liquid crystalline polyesters, polyarylates, and polyester copolymers such as polyestercarbonates and polyesteramides. Also included are polyesters that have been reacted with relatively low levels of diepoxide or polyepoxide compounds. It is also possible to use branched polyesters in which a branching agent, for example, a glycol having three or more hydroxyl groups or a trifunctional or multifunctional carboxylic acid has been incorporated. Treatment of the polyester with a polyepoxide, for example triglycidyl isocyanurate, can also be used to make branched polyester.

Liquid crystalline polyesters having melting points less that 380° C. and comprising recurring units derived from aromatic diols, aliphatic or aromatic dicarboxylic acids, and aromatic hydroxy carboxylic acids are also useful. Mixtures of polyesters are also sometimes suitable.

The cover composition can include 40 to 90 wt % of polyesters such as these, based on the total weight of the composition. Within this range the composition can include less than or equal to 80 wt %, or, more specifically, less than or equal to 75 wt %, or, even more specifically, less than or equal to 65 wt % polyester. Also within this range, the composition can include greater than or equal to 45 wt %, or, more specifically, greater than or equal to 50 wt % polyester.

The cover composition may also include an impact modifier. Examples of suitable impact modifiers include block copolymers; elastomers such as polybutadiene; copolymers such as ethylene vinyl acetate; and combinations of these. Exemplary block copolymers include A-B diblock copolymers and A-B-A triblock copolymers having one or two hard blocks A, which, for example, may be structural units derived from an alkenyl aromatic monomer such as styrene, and a rubber block, B, which generally comprises structural units derived from a diene such as isoprene or butadiene. The diene block may be partially hydrogenated. Nonlimiting examples of suitable A-B and A-B-A copolymers include polystyrene-polybutadiene; polystyrene-poly(ethylene-butylene); polystyrene-polyisoprene; polystyrene-poly(ethylene-propylene); poly(alpha-methylstyrene)-polybutadiene; poly(alpha-methylstyrene)-poly(ethylene-butylene); polystyrene-polybutadiene-polystyrene; polystyrene-poly(ethylene-butylene)-polystyrene; polystyrene-polyisoprene-polystyrene; polystyrene-poly(ethylene-propylene)-polystyrene; poly(alpha-methylstyrene)-polybutadiene-poly(alpha-methylstyrene); as well as selectively hydrogenated versions of these and combinations of these. Such A-B and A-B-A block copolymers are available commercially from a number of sources, including Phillips Petroleum under the trademark SOLPRENE, Kraton Polymers, under the trademark KRATON, Dexco under the trademark VECTOR, and Kuraray under the trademark SEPTON.

In addition to the poly(arylene ether), polyester, and impact modifier, the poly(arylene ether) cover composition may include a polymeric compatibilizer having an average of three or more pendant epoxide groups per molecule. In some embodiments the polymeric compatibilizer has an average of at least 8 pendant epoxide groups per molecule. Illustrative examples of suitable compatibilizers include, but are not limited to, copolymers of glycidyl methacrylate (GMA) with alkenes, copolymers of GMA with alkenes and acrylic esters, copolymers of GMA with alkenes and vinyl acetate, copolymers of GMA and styrene. Suitable alkenes comprise ethylene, propylene, and mixtures of them. Suitable acrylic esters comprise alkyl acrylate and methacrylates, including, but not limited to, methyl (meth)acrylate, ethyl (meth)acrylate, propyl (meth)acrylate, butyl (meth)acrylate, and so on, where (meth)acrylate indicates both the acrylate and the methacrylate. When present, the acrylic ester may be used in an amount of 15 wt % to 35 wt % based on the total amount of monomer used in the copolymer. When present, vinyl acetate may be used in an amount of 4 wt % to 10 wt % based on the total amount of monomer used in the copolymer. Illustrative examples of suitable compatibilizers comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers.

Polycarbonate resins derived from bisphenol A and phosgene, which are high molecular weight aromatic carbonate polymers, may also be used to make the hard cover. Polycarbonates may be branched or unbranched and generally will have a weight average molecular weight of from about 10,000 to about 200,000, preferably from about 20,000 to about 100,000 as measured by gel permeation chromatography. Polycarbonate/polyester blends may be used. Other polymer blends include polyester and polycarbonate combinations that are miscible. In particular, the polyester may be polymerized using terephthalic acid or isophthalic acid and 1,4-cyclohexanedimethanol or neopentyl glycol as well as combinations of these.

The cover may be formulated with a pigment, such as a color pigment or white pigment, and in particular a white pigment such as titanium dioxide or zinc oxide. Generally titanium dioxide is used as a white pigment, for example in amounts of from about 0.5 parts by weight or 1 part by weight to about 8 parts by weight or 10 parts by weight passed on 100 parts by weight of resin or polymer. In various embodiments, a white-colored cover may be tinted with a small amount of blue pigment or brightener.

The cover may also contain one or more customary additives such as fillers, dispersants, hindered amine light stabilizers such as piperidines and oxanalides, ultraviolet light absorbers such as benzotriazoles, triazines, and hindered phenols, antioxidants such as phenols, phosphites, and hydrazides, plasticizers, defoaming agents, processing aids, surfactants, fluorescent materials and fluorescent brighteners, and so on. Examples of suitable inorganic fillers include zinc oxide, zinc sulfate, barium carbonate, barium sulfate, calcium oxide, calcium carbonate, clay, tungsten, tungsten carbide, tin oxide, zinc carbonate, silica, talc, clays, glass fibers, and natural fibrous minerals. Suitable organic fillers may include melamine colophony, cellulose fibers, polyamide fibers, polyacrylonitrile fibers, polyurethane fibers, or polyester fibers. Polymeric, ceramic, metal, and glass microspheres also may be used. Combinations of any of these may be used. Fillers may be used to adjust the specific gravity, modulus, and other physical properties of the cover. The total amount of the filler may be from about 0.5 to about 30 percent by weight of the polymer components. Wetting or dispersing additives may be used to more effectively disperse the pigments and particulate fillers. Generally, the additives will be present in the composition in an amount between about 1 and about 70 weight percent based on the total weight of the composition depending upon the desired properties.

Typically, the cover may have a thickness of from about 0.5 mm to about 3 mm.

The cover is formed on the core (unitary or with outer layers) by injection molding, compression molding, casting, vacuum forming, powder coating, injection molding, and so on. For example, when the cover is formed by injection molding, a core fabricated beforehand may be set inside a mold, and the cover material may be injected into the mold. The cover is typically molded on the core by injection molding or compression molding. Reaction injection molding may be used to provide a thermoset cover. Alternatively, another method that may be used involves pre-molding a pair of half-covers from the cover material by die casting or another molding method, enclosing the core in the half-covers, and compression-molding at, for example, between 120° C. and 170° C. for a period of 1 to 5 minutes to attach the cover halves around the core. In another method, the cover composition may be cast about the core. The cast cover is preferably cured in a closed mold. The casting process may be performed under nitrogen. A first half of the cover may be formed in a mold over the core, then a second half of the cover assembled to the first half and cured to form a finished cover. The core may be surface-treated before the cover is formed over it to increase the adhesion between the core and the cover. Nonlimiting examples of suitable surface preparations include mechanically or chemically abrasion, corona discharge, plasma treatment, or application of an adhesion promoter such as a silane. The cover typically has a dimple pattern and profile to provide desirable aerodynamic characteristics to the golf ball.

The golf ball has a soft coating on the hard cover. The soft coating has a hardness that is measured as one of: (a) a pencil hardness of 2 B or less; (b) a Sward hardness of about 40 or less; or (c) a Hit (Young's Modulus)<20 N/mm$^2$ and $h_{max}$>0.55 micrometer. In various embodiments, the soft coating may have a pencil hardness of from 7 B to 2 B, or from 6 B to 2 B, or from 6 B to 3 B, or a Sward hardness from about 22 to about 40 or from about 25 to about 35, or a Hit (Young's Modulus) from about 3 N/mm$^2$ up to about 20 N/mm$^2$ or from about 3 N/mm$^2$ up to about 18 N/mm$^2$ or from about 5 N/mm$^2$ up to about 15 N/mm$^2$ and $h_m$ from about 0.55 micrometer to about 1.3 micrometer or from about 0.6 micrometer to about 1.25 micrometer.

The soft coating may be a thermoplastic or thermoset polyurethane coating, or polyurethane-polyurea combination, preferably a thermoset coating. Other types of coatings of my be utilized are two component, aliphatic epoxies, unsaturated polyesters with a peroxide cure, waterborne two component polyurethanes and UV cured acrylate oligomers to name a few. In certain preferred embodiments, the coating comprises a polyurethane that is a reaction product of (a) at least one polyisocyanate, (b) at least one polymeric polyol, (c) optionally, at least one further reactant with two or more isocyanate-reactive groups (or "extender"), and (d) optionally, a polysiloxane or fluoropolymer having at least one functional group reactive with isocyanate, hydroxyl, or with another functional group present in one of the reactants forming the polyurethane. The polyisocyanates, polymeric diols, and extenders may be selected from those already mentioned and apportioned to so that the coating containing the polyurethane has the required hardness.

The polymeric diol-based polyurethanes may be prepared by reaction of a polymeric diol (polyester diol, polyether diol, polycaprolactone diol, polytetrahydrofuran diol, or polycarbonate diol) such as any of those described above, one or more diisocyanates, and, optionally, lower molecular diols or polyols, branched polymeric polyols, diamines or higher functionality amines, or polyisocyanates. In other embodiments, the coating may be prepared by reacting together a first coating composition component containing the polyisocyanate with a second coating component containing the polymeric diol and optionally extender or further reactants with isocyanate-reactive functionality.

Some soft coating embodiments include as preferred polyisocyanates the biurets or isocyanurates of one or more of hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate and 1,3-bis(isocyanatomethyl)cyclohexane (BIC), diisocyanates derived from dimeric fatty acids, 1,8-diisocyanato-4-isocyanatomethyloctane, 1,7-diisocyanato-4-isocyanatomethylheptane, 1-isocyanato-2-(3-isocyanatopropyl)cyclohexane, 2,4- and 2,6-tolylene diisocyanate, 4,4'-diphenylmethane diisocyanate, naphthalene diisocyanate, and mixtures of these. In various embodiments, aliphatic diisocyanates and biurets and other oligomers of aliphatic diisocyanates are preferred, particularly oligomeric hexamethylene diisocyanate.

Oligomeric hexamethylene diisocyanate is commercially available from, for example, Perstorp Coatings, the Dow Chemical Company, BASF Corporation, and Bayer MaterialScience LLC. One preferred product is a low viscosity solvent-free aliphatic polyisocyanate having an NCO equivalent weight of about 179 available solvent free as Tolonate® HDB-LV from Perstorp Coatings.

In certain preferred embodiments, the polyurethane is prepared from a polyester diol. Among preferred polyester polyols that may be used are those prepared by reacting ethylene glycol, diethylene glycol, and 1,4-butanediol with adipic acid or itaconic acid and those prepared by reacting one or more of isophthalic acid, phthalic anhydride, and adipic acid with 1,6-hexanediol and a minor amount of trimethylolpropane to provide a slightly branched polyester polyol. In various preferred embodiments, the coating includes a polyurethane made using both a linear polyester and a branched polyester.

Homopolymers or copolymers of ethylene oxide or propylene oxide are preferred as polyurethane reactants for some soft golf ball coatings.

The polymeric diols that are used in the polyurethane synthesis, such as the polymeric polyester and polyether diols described above, may preferably have a number average molecular weight (determined for example by the ASTM D-4274 method) of from about 300 to about 4,000; more preferably from about 400 to about 3,000; and still more preferably from about 500 to about 2,500.

In particular embodiments, linear polyester polyols having a hydroxyl equivalent weight of at least about 350, preferably 350 to 1500 are used. Examples of suitable polyester polyols that are commercially available include Desmophen® 1652, a linear polyester polyol having an equivalent weight of about 1060, and Desmophen® 670A-80, a polyester having a hydroxyl equivalent weight of 500, available from Bayer.

Suitable extenders with other isocyanate-reactive groups, such as any of those already mentioned, may be included in the polyurethane reaction mixture and in particular may be mentioned ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, trimethylolpropane, pentaerythritol, and combinations of these. The molecular weight of the chain extenders preferably range from about 60 to about 400. Alcohols and amines are preferred. In addition to difunctional extenders, a small amount of a trifunctional extender such as trimethylol propane, 1,2,6-hexanetriol and glycerol, or monofunctional active hydrogen compounds such as butanol or dimethyl amine, may also be present. The amount of trifunctional extender or monofunctional compound employed may be, for example, 5.0 equivalent percent or less based on the total weight of the reaction product.

In certain embodiments, the golf balls may have a soft outer surface coating comprising both urethane and urea linkages resulting from reaction of the polyisocyanate reactant with both hydroxyl-containing reactants and amine-containing reactants. Such amine compounds have primary or secondary amine groups, examples of which include diethylenetriamine and polyether amines.

In certain embodiments, the reactants may further include a surface tension-reducing reactant selected from fluoropolymers and polysiloxanes having isocyanate-reactive functional groups. Nonlimiting suitable examples of such functionalized fluoropolymer and polysiloxane reactants include bis(3-aminopropyl) terminated poly(dimethylsiloxane), bis (hydroxyalkyl) terminated poly(dimethylsiloxane), dihydroxy terminated poly(dimethylsiloxane-co-diphenylsiloxane), hydroxy terminated poly(dimethylsiloxane), dihydroxy terminated poly(dimethylsiloxane) (also called disilanol terminated poly(dimethylsiloxane)) and hydroxy-functional fluoropolymers such as those described in U.S. Pat. No. 4,345,057, assigned to Asahi Glass Company, which detail the synthesis of fluorinated ethylene-(hydroxyalkyl) vinyl ether (FEVE) copolymers.

The polyurethane polymerization may be carried out neat or in organic solution. The reaction of the polyisocyanate, polymeric diol, optional extender and optional polysiloxane or fluoropolymer having at least one functional group reactive with isocyanate, hydroxyl, or with another functional group present in one of the reactants forming the polyurethane is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, bismuth octoate, tertiary amines, zinc salts, and manganese salts. The amount and identity of polymeric diol, such as polyester diol, is selected to provide a soft coating layer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.05:1. The polymeric diol segments typically are from about 35% to about 65% by weight of the polyurethane polymer, and preferably from about 35% to about 50% by weight of the polyurethane polymer.

In various embodiments, the soft coating may include one or more thermoplastic or thermoset polyureas. Suitable polyureas may be prepared by reaction of one or more polymeric polyamines with one or more of the polyisocyanates, such any of those already mentioned, optionally one or more extender, such as any of the extenders already mentioned, and, optionally, a fluoropolymer or polysiloxane having isocyanate-reactive functional groups, amine-reactive functional groups, or functional groups reactive with another functionality on a reactant used in making the polyurea. Nonlimiting examples of suitable polyamines include diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl) ether), 1-methyl-2,6-diamino-cyclohexane, 1,4-diamino-cyclohexane, poly(oxyethylene-oxypropylene)diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, polytetramethylene ether diamines, 3,3',5,5'-tetraethyl-4,4'-diamino-dicyclohexylmethane (i.e., 4,4'-methylene-bis(2,6-diethylaminocyclohexane)), 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine, glycerin-based triamines, tetramines such as N,N'-bis(3-aminopropyl)ethylene diamine, triethylene tetramine; unsaturated diamines such as 4,4'-diamino-diphenylmethane (i.e., 4,4'-methylene-dianiline or "MDA"). Aromatic amines are not preferred because of a greater tendency to yellow. The amine- and hydroxyl-functional extenders already mentioned may be used as well. Generally, as before, trifunctional reactants are limited unless a thermoset polymer is desired.

A soft polyurethane coating may be made and applied to the cover in various ways. In a first variation, the isocyanate-functional reactants and the hydroxyl-functional reactants or amine-functional reactants are combined only shortly prior to application in a two-pack (or two-part or two-component or 2K) coating method in which the reactants react to form the polyurethane or polyurea in the applied coating layer in curing the coating. In a second variation, the reactants are reacted to form a thermoplastic polyurethane, which may be formulated into a solventborne or waterborne coating composition with other components. Generally, lower molecular weight polymers are formulated into a coating that includes a crosslinker for the polymer. If the coating composition is formulated with a crosslinker, then the applied coating is cured after application; typically, this is done by heating or baking the applied coating to a crosslinked coating layer on the ball. In a third variation, the coating is made by preparing an isocyanate-functional polyurethane or polyurea prepolymer, then dispersing the prepolymer in water in the presence of a diamine extender to form a high molecular weight, linear or slightly branched polyurethane or polyurea in aqueous dispersion. A coating prepared with the high molecular weight polymer may optionally include a crosslinker and be crosslinked after application of the coating layer to the cover.

In other embodiments, the coating layer may be prepared using two-component, aliphatic epoxies, unsaturated polyesters with a peroxide cure, waterborne two component polyurethanes, and UV-cured acrylate oligomers to name a few. In each case, the reactants producing the coating layer and other coating components are selected and apportioned to provide a soft coating layer.

The coating composition may include further binder components and other desired materials such as other binder resins, crosslinkers for the polyurethane or other binder resins, low molecular weight, crosslinkable binder components, additives selected from dyes, flow control agents, additives that modify surface tension, plasticizers, wetting agents, surfactants, UV absorbers, HALS compounds, and other light stabilizers, antioxidants, defoamers, antioxidants, emulsifiers, slip additives, adhesion promoters, waxes, siccatives, biocides, matting agents, optical brighteners, and so on, in effective amounts.

In the case of a two-component coating, either component or both components can contain catalyst, solvents, and other reactants or binder components and additives such as those just recited.

The coating composition (or, in the case of a two-component coating composition, each component) may be produced by mixing and homogenizing the various constituents using typical and known mixing methods and apparatus such as stirred tanks, inline dissolvers, static mixers, micromixers, toothed-wheeled dispersers, and microfluidizers.

In certain preferred embodiments, the soft coating contains no pigments or fillers.

In the case of a two-component coating, either component or both components can contain catalyst, solvents, and other reactants or binder components and additives such as those just recited.

Depending on the composition of the cover, the cover may usefully be prepared to accept the coating layer by application of a primer or adhesion promoter to its surface or by treating its surface with a plasma pretreatment, corona pretreatment, UV irradiation treatment, and electron beam irradiation treatment or flame pretreatment, by sanding, or by otherwise mechanically abrading the surface of the cover. FIG. 2 shows a golf ball in which a clear primer or adhesion promoter layer 108 is applied to the surface of the cover 104 before coating 106.

The coating composition can be applied to the golf ball cover by various methods, such as by spraying, brushing, dipping, rolling, roller coating, flow coating, laminating, or injection backmolding. The particular application method will depend on the coating formulation, as well-known in the coatings art. If the coating composition contains solvent (whether organic or water), the solvent evaporates in forming a coating layer on the golf ball. The applied coating may be heated, for example to temperatures from about 150° F. to about 200° F. (about 65.6° C. to about 93.3° C.) to facilitate solvent evaporation or, in the case of a thermosetting coating, to also cure the binder.

Depending on the composition of the cover, the cover may usefully be prepared to accept the coating layer by application of a primer or adhesion promoter to its surface or by treating its surface with a plasma pretreatment, corona pretreatment, UV irradiation treatment, and electron beam irradiation treatment or flame pretreatment, by sanding, or by otherwise mechanically abrading the surface of the cover. FIG. 2 shows a golf ball in which a clear primer or adhesion promoter layer 108 is applied to the surface of the cover 104 before coating 106.

Typically, the soft coating layer has a thickness of from about 5 µm to about 100 µm. In various embodiments, the coating layer may be from about 5 µm or about 10 µm or about 15 µm to about 100 µm or about 75 µm or about 50 µm or about 25 µm or about 20 µm thick.

Golf balls made in accordance with this invention can be of any size, although the USGA requires that golf balls used in competition have a diameter of at least 1.68 inches and a weight of no greater than 1.62 ounces. For play outside of USGA competition, the golf balls can have smaller diameters and be heavier.

The following examples illustrate, but do not in any way limit, the scope of the methods and compositions as described and claimed. All parts are parts by weight unless otherwise noted.

EXAMPLES

Preparation of Coating Compositions

The materials of the first component as shown in Table 1 are combined and mixed until homogenous. The first component and the second component are mixed together just before application of the coating composition to a golf ball cover.

TABLE 1

|  | Coating Example 1, grams | Coating Example 2, grams | Coating Example 3, grams | Coating Example 4, grams |
|---|---|---|---|---|
| First Component: | | | | |
| Desmophen 1652 | 100 | 100 | 50 | 25 |
| Desmophen 670 | 50 | 100 | 100 | 100 |
| methyl isobutyl ketone | 140 | 140 | | |
| methyl amyl ketone | | | 150 | 100 |
| ethyl acetate | | | | 50 |
| n-Butyl Acetate | 140 | 140 | 70 | 50 |
| toluene | 140 | 140 | | |
| Ethyl Acetate | | | 70 | |
| BYK3700 | | | 3 | 3 |
| BYK-370 | 3 | 3 | | |
| Second Component | | | | |
| Tolonate HDB-LV | 41.8 | 65.5 | 56.71 | 52.24 |

Coating Golf Balls and Testing Coated Golf Balls

The golf ball coating was spray applied using automatic HVLP spray guns. The coated golf balls within heated and cured in a 150° F. oven. The hardnesses of the coating layers were tested on the balls and the values determined are shown in Table 2. Normal coatings on control golf balls were tested for comparison.

TABLE 2

|  | Hmax (micrometers) | Hit (Young's Modulus) | Pencil Hardness | Sward Hardness |
|---|---|---|---|---|
| Soft Coating Example 1 |  |  | 6B-7B | 28 or less |
| Soft Coating Example 2 | 1.26 | 4.0 | 4B-5B | 24 |
| Soft Coating Example 3 | 1.08 | 4.3 | 4B | 22 |
| Soft Coating Example 4 | 1.14 | 3.6 | 3B |  |
| Soft Coating Example 5 | 0.23 | 42 | 4B | 22 |
| Normal Coating Example 1 | 0.12 | 297 | B-HB |  |
| Normal Coating Example 2 | 0.12 | 297 | B-HB |  |

The behavior of the balls when hit with a club were tested using a robot to hit a club against the ball. The ballspeed, launch angle, and spin rate were measured using a golf ball launch monitor and are shown in Table 3 along with the resulting backspin.

The results of this test demonstrate that lower spin rates are seen off the mid-irons but higher spin rates are seen on the shorter shots such as wedge shots into the green.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A golf ball, comprising a cover with a Shore D hardness of about 60 to about 76 and a coating on the cover, wherein the coating has a pencil hardness of 7B to 4B.

2. A golf ball according to claim 1, wherein the coating has a pencil hardness of 5B to 4B.

3. A golf ball according to claim 1, wherein the coating is free of pigment and filler.

4. A golf ball according to claim 1, wherein the coating comprises a polyurethane.

5. A golf ball according to claim 4, wherein the polyurethane is a reaction product of (a) at least one polyisocyanate, (b) at least one polymeric polyol, (c) optionally, at least one extender with two or more isocyanate-reactive groups, and (d) optionally, a polysiloxane or fluoropolymer having at least one functional group reactive with at least one of components (a)-(c).

6. A golf ball according to claim 5, wherein the component (a) comprises a biuret of an aliphatic diisocyanate.

7. A golf ball according to claim 1, wherein the coating comprises a polyurethane that is the reaction product of an aliphatic biuret, a linear polyester diol, and a branched polyester polyol.

TABLE 3

|  |  | Soft Cover | | | | | | | Harder Cover | | |
|---|---|---|---|---|---|---|---|---|---|---|---|
|  |  | Soft Coating Example 1 | Soft Coating Example 2 | Soft Coating Example 3 | Soft Coating Example 4 | Soft Coating Example 5 | Normal Coating Example 1 | Normal Coating Example 2 | Soft Coating Example 1 | Soft Coating Example 2 | Normal Coating Example 1 |
|  | Shore D measured on ball | 49.5 | 48.9 | 49-52 | 49-52 | 49-52 | 52.6 | 51.4 | 60.1 | 61.6 | 62.1 |
| 6 iron Robot Test | Ballspeed (mph) | 135.9 | 135.6 |  |  |  | 135.6 | 134.8 | 136.5 |  | 136.0 |
|  | Launch Angle (deg) | 10.6 | 10.7 |  |  |  | 10.6 | 10.7 | 10.8 |  | 10.7 |
|  | Backspin (rpm) | 5588 | 5533 |  |  |  | 5763 | 5634 | 5472 |  | 5526 |
|  | Change in spin compared to normally coated ball (rpm) | −110 | −165 |  |  |  |  |  | −54 |  |  |
| 40 yd wedge Robot Test | Ballspeed (mph) | 46.4 | 46.4 |  |  |  | 46.3 | 46.2 | 46.4 | 46.2 | 46.1 |
|  | Launch Angle (deg) | 29.4 | 30.0 |  |  |  | 30.0 | 30.6 | 30.5 | 30.8 | 31.3 |
|  | Backspin (rpm) | 6522 | 6344 |  |  |  | 6302 | 6277 | 6169 | 6007 | 5767 |
|  | Change in spin compared to normally coated ball (rpm) | 233 | 55 |  |  |  |  |  | 402 |  |  |
| Putting Robot Test | Putting Distance Avg. (in) |  |  | 79.4 | 80.8 | 83.1 | 84.2 |  |  |  | 84.8 |
| 7 iron Robot Sound Test | Peak frequency [kHz] |  |  |  |  | 2.499 | 2.502 |  |  |  | 2.814 |
|  | Loudness [dBA] |  |  |  |  | −37.09 | −36.84 |  |  |  | −36.35 |

8. A golf ball according to claim 1, wherein the cover comprises a thermoset polyurethane or a partially crosslinked thermoplastic polyurethane.

9. A method of making a golf ball, comprising coating a golf ball having a cover with a coating composition comprising (a) at least one polyisocyanate, (b) at least one polymeric polyol, (c) optionally, at least one extender with two or more isocyanate-reactive groups, and (d) a polysiloxane or fluoropolymer having at least one functional group reactive with at least one of components (a)-(c), wherein the cover has a Shore D hardness of about 60 to about 76 and wherein the coating composition is reacted to produce a coating having a pencil hardness of 7B to 4B.

* * * * *